United States Patent
Du

(10) Patent No.: US 10,263,798 B2
(45) Date of Patent: Apr. 16, 2019

(54) VALIDATING HYPERTEXT TRANSFER PROTOCOL MESSAGES FOR A TOLL-FREE DATA SERVICE

(71) Applicant: Verizon Patent and Licensing Inc., Arlington, VA (US)

(72) Inventor: Chunyan Du, Bedford, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 581 days.

(21) Appl. No.: 14/980,382

(22) Filed: Dec. 28, 2015

(65) Prior Publication Data
US 2017/0187543 A1 Jun. 29, 2017

(51) Int. Cl.
| G06Q 40/00 | (2012.01) |
|---|---|
| H04M 11/00 | (2006.01) |
| G06F 15/16 | (2006.01) |
| G06F 15/173 | (2006.01) |
| H04L 12/14 | (2006.01) |
| G06Q 30/02 | (2012.01) |
| H04L 29/08 | (2006.01) |
| H04L 29/06 | (2006.01) |

(52) U.S. Cl.
CPC ..... *H04L 12/1435* (2013.01); *G06Q 30/0283* (2013.01); *H04L 63/062* (2013.01); *H04L 67/025* (2013.01)

(58) Field of Classification Search
None
See application file for complete search history.

(56) References Cited

U.S. PATENT DOCUMENTS

| 6,181,690 B1* | 1/2001 | Civanlar | H04L 12/2856 370/352 |
|---|---|---|---|
| 2003/0135653 A1* | 7/2003 | Marovich | H04L 29/06 709/250 |
| 2009/0157675 A1* | 6/2009 | Stellhorn | G06Q 10/107 |
| 2012/0221494 A1* | 8/2012 | Pasetto | G06N 5/00 706/12 |

* cited by examiner

*Primary Examiner* — Jason Borlinghaus

(57) ABSTRACT

A device may receive network traffic. The device may determine that the network traffic includes a hypertext transfer protocol (HTTP) message. The device may determine, based on the HTTP message, that the network traffic is associated with a toll-free data service. The toll-free data service may cause a first party to be billed for data usage associated with the network traffic by a second party. The device may perform validation operations, based on validation information included in the HTTP message, to determine whether to provide the network traffic or drop the network traffic. The network traffic may be provided when the validation operations are successful, and may be dropped when the validation operations are unsuccessful. The device may cause the first party or the second party to be billed for the data usage based on the network traffic being associated with the toll-free data service.

20 Claims, 5 Drawing Sheets

VALIDATING HYPERTEXT TRANSFER PROTOCOL MESSAGES FOR A TOLL-FREE DATA SERVICE

BACKGROUND

Content providers, such as online media companies, may wish to deliver content to network users. Some content providers may choose to subsidize the cost of network data usage which would otherwise be paid by the network users accessing the content.

DETAILED DESCRIPTION OF PREFERRED EMBODIMENTS

The following detailed description of example implementations refers to the accompanying drawings. The same reference numbers in different drawings may identify the same or similar elements.

A content provider may want to provide content to a network user. The content provider may want to subsidize the cost of network data usage which would ordinarily be charged to the network user to access the content. A network operator may want to determine whether network traffic is to be billed to the content provider or the network user, may want to track particular information and/or metadata transmitted in the network traffic, or the like. However, the particular information and/or metadata may be included in packets, network addresses, etc. of the network traffic, and may be difficult to extract. Furthermore, in a situation where the particular information and/or metadata is tracked by a device with multiple cores, chips, cards, or the like (e.g., data path cores, accounting cores, etc.), it may be difficult to track the particular information and/or metadata when different cores (e.g., chips, cards, etc.), of the device, process the network traffic.

Implementations described herein may assist the network operator in billing toll-free content and tracking information and/or metadata regarding toll-free content. In some cases, a network processing unit may determine the information and/or metadata based on regular expressions, which enables the network processing unit to more quickly make decisions regarding billing information. Furthermore, implementations described herein may enable the network processing unit to track a toll-free data session when some toll-free content is processed by a first core of the network processing unit and other toll-free content is processed by a second core of the network processing unit, which permits the network processing unit to use an increased quantity of cores (e.g., chips, cards, etc.), thereby increasing throughput as compared to tracking information and/or metadata using a single core.

Figure 1A:
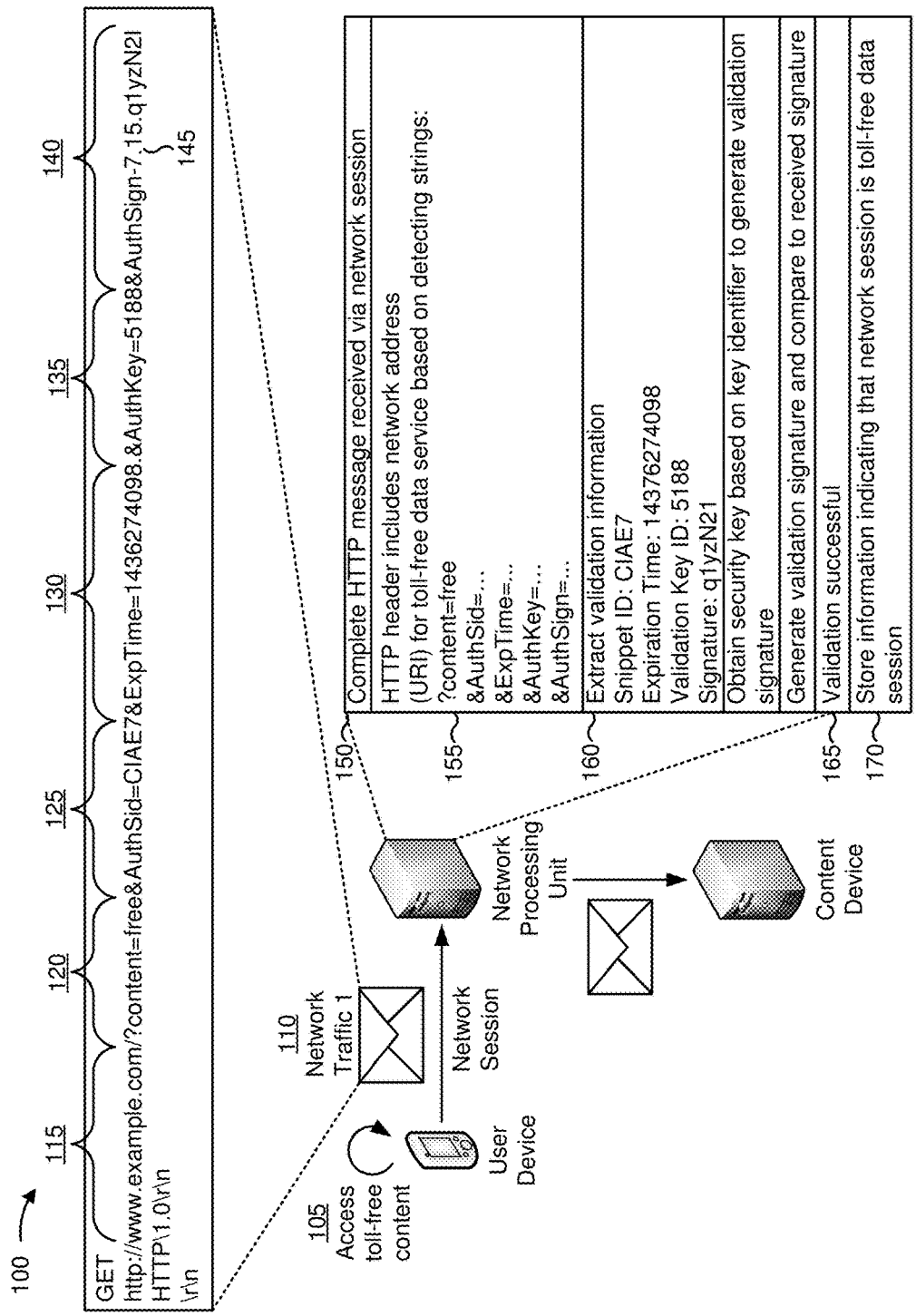
FIGS. 1A and 1B are diagrams of an overview of an example implementation described herein.
Figure 1B:
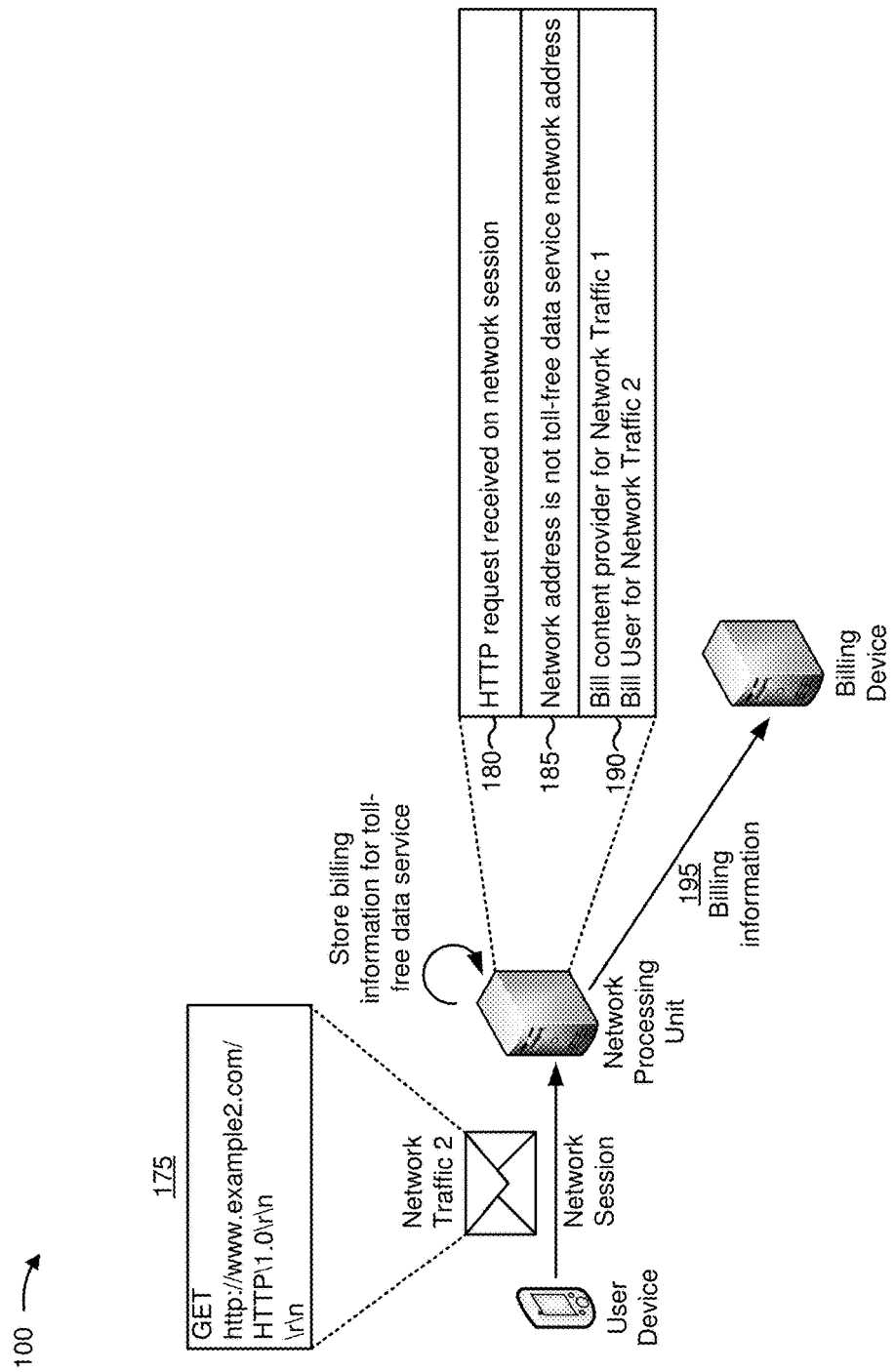

FIGS. 1A and 1B are diagrams of an overview of an example implementation 100 described herein. As shown in FIG. 1A, and by reference number 105, a user device may access toll-free content. The toll-free content may be associated with a toll-free data campaign, based on which a content provider may be billed for content accessed by the user device. As shown by reference number 110, based on the user device accessing the toll-free content, the user device may transmit first network traffic (e.g., Network Traffic 1) to a network processing unit via a network session. For example, the user device may establish the network session with a content device that hosts the toll-free content, and may provide the network traffic to the content device via the network session.

As shown, the network traffic may include an HTTP request (e.g., based on the network traffic including an HTTP message type of "GET," a network address, and information identifying a protocol of HTTP\1.0). As shown by reference number 115, the network address may include information identifying content to be accessed (e.g., content associated with a uniform resource identifier (URI) of www.example.com). As shown by reference number 120, the network address may include information (e.g., a tag) indicating that the network address is associated with a toll-free data campaign (e.g., ?content=free). As shown by reference number 125, the network address may include a snippet identifier (e.g., CIAE7). The snippet identifier may identify the toll-free data campaign, and may be identified in the network address by a particular string (e.g., &AuthSid=).

As shown by reference number 130, the network address may include an expiration time (e.g., a Unix time of 1436274098). Network processing unit 220 may determine whether the toll-free data campaign has expired based on whether a current time is higher than the expiration time. As further shown, the network address may include a string that identifies the expiration time (e.g., &ExpTime=). As shown by reference number 135, the network address may include a key identifier (e.g., 5188). The key identifier may be associated with a security key that may be used to generate a signature, as described in more detail below. As shown, the key identifier may be identified by a particular string (e.g., &AuthKey=).

As shown by reference number 140, the network address may include a signature (e.g., q1yzN2I). The signature may be generated based on the security key associated with the key identifier of 5188. As further shown, the signature may be identified by a tag (e.g., &AuthSign=). As shown by reference number 145, the network address may identify a location and a length of the URI of www.example.com. Here, "www.example.com" begins at a seventh character of the network address and is fifteen characters long.

As shown by reference number 150, the network processing unit may determine that a complete HTTP message was received via the network session. For example, the network processing unit may use one or more regular expressions to detect the HTTP message type of "GET," the network address, and the strings of \r\n\r\n at the end of the HTTP message. As shown by reference number 155, the network processing unit may detect the network address, and may determine that the network address is associated with the toll-free data service based on detecting strings in the network address. Here, the network processing unit detects strings of ?content=free, &AuthSid, &ExpTime, &AuthKey, and &AuthSign, and determines that the network address is associated with the toll-free data service based on detecting the strings.

As shown by reference number 160, the network processing unit may extract validation information from the network address. Here, the network processing unit extracts the snippet identifier, the expiration time, the key identifier, and the signature. For example, the network processing unit may use one or more regular expressions to detect the tags (e.g., strings) associated with the validation information, and may extract the validation information based on the detected tags.

As shown, the network processing unit may obtain a security key based on the key identifier to generate a validation signature. For example, the network processing unit may store the security key, may obtain the security key from a validation device, or the like. As further shown, the network processing unit may generate a validation signature using the security key, and may compare the validation signature to the signature extracted from the network address. The network processing unit may generate the validation signature based on, for example, the URI of www.example.com, the snippet identifier, the key identifier, the expiration time, or the like.

As shown by reference number 165, the network processing unit successfully validates the network address. For example, the network processing unit may successfully validate the network address based on the validation signature matching the received signature, based on the expiration time not having passed, based on received validation information matching expected validation information, or the like. As shown by reference number 170, based on successfully validating the network address, the network processing unit may store information indicating that the network session is associated with a toll-free data service. For example, the network processing unit may store information identifying the network session (e.g., based on a session identifier, based on a source and/or destination of the network session, etc.), may store billing information for data usage via the network session, or the like.

As shown in FIG. 1B, and by reference number 175, the network processing unit may receive second network traffic (e.g., Network Traffic 2) via the network session (e.g., the toll-free data session). As shown by reference number 180, the network processing unit may determine that the second network traffic includes an HTTP message (e.g., an HTTP request). As shown by reference number 185, the network processing unit may determine that a network address associated with the HTTP message is not associated with a toll-free data service (e.g., the network address of http://www.example2.com). For example, the network processing unit may determine that the network address does not include a string of ?content=free, does not include validation information, or the like (e.g., based on one or more regular expressions, etc.).

As shown by reference number 190, based on determining that the network address is not associated with the toll-free data service, the network processing unit may cause a content provider (e.g., a content provider associated with the toll-free data service) to be billed for data usage associated with the first network traffic (e.g., based on the first network traffic being associated with the toll-free data service and successfully validated), and may cause a user (e.g., a user associated with the user device) to be billed for data usage associated with the second network traffic. For example, the network processing unit may store billing information identifying the data usage associated with the first network traffic and the second network traffic based on processing and/or providing the first network traffic and the second network traffic. As shown by reference number 195, to cause the content provider and the user to be billed, the network processing unit may provide the billing information to a billing device.

In this way, a network processing unit causes an appropriate party to be billed for data usage when accessing toll-free content. In some cases, the network processing unit may use regular expressions, or a similar method of parsing strings, to identify information related to billing for the data usage, which conserves processor resources of the network processing unit by enabling the network processing unit to more quickly make decisions regarding billing information. In some cases, the network processing unit may track data usage using multiple, different cores (e.g., chips, cards, etc.), which improves capacity of the network processing unit.

As indicated above, FIGS. 1A and 1B are provided merely as an example. Other examples are possible and may differ from what was described with regard to FIGS. 1A and 1B.

Figure 2:
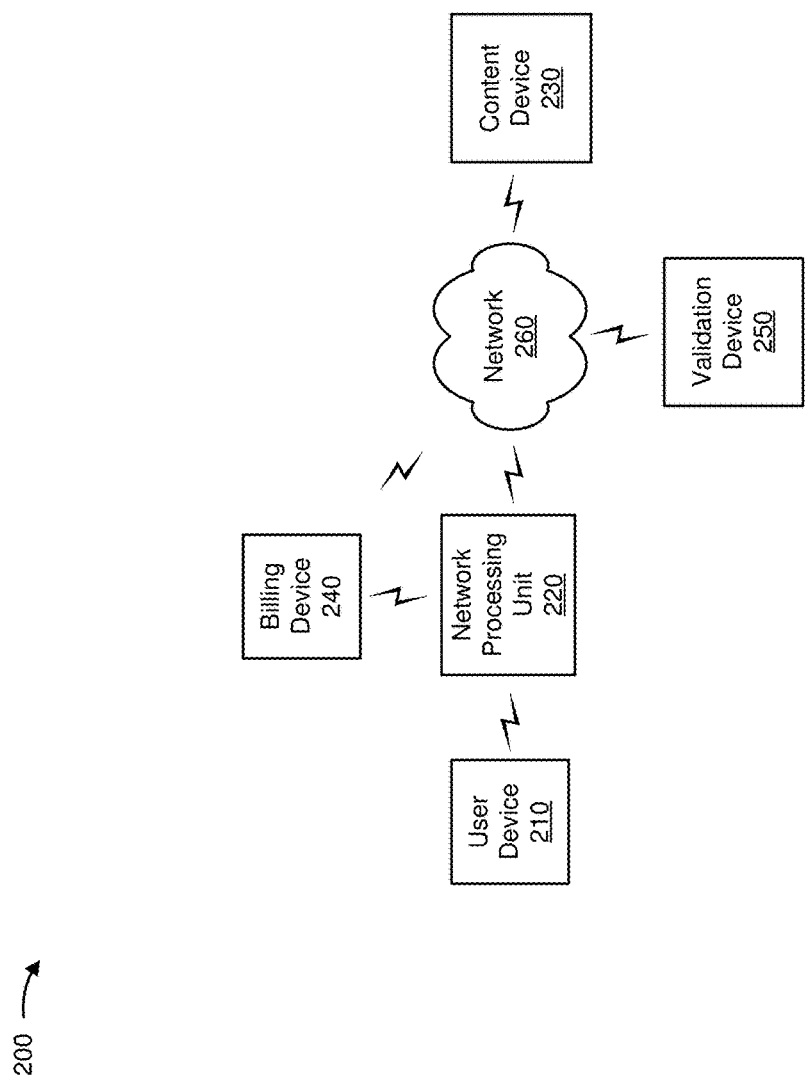
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a network processing unit 220, a content device 230, a billing device 240, a validation device 250, and a network 260. Devices of environment 200 may interconnect via wired connections, wireless connections, or a combination of wired and wireless connections.

User device 210 may include one or more devices capable of receiving, generating, storing, processing, and/or providing information. For example, user device 210 may include a communication and computing device, such as a mobile phone (e.g., a smart phone, a radiotelephone, etc.), a laptop computer, a tablet computer, a handheld computer, a gaming device, a set top box, a wearable communication device (e.g., a smart wristwatch, a pair of smart eyeglasses, etc.), or a similar type of device. In some implementations, user device 210 may receive information from and/or transmit information to another device in environment 200.

Network processing unit 220 may include one or more devices capable of receiving, processing, storing, and/or transferring traffic associated with network 260. For example, network processing unit 220 may include a server, a gateway, a firewall, a router, or a similar device. In some implementations, network processing unit 220 may include multiple different cores (e.g., chips, cards, etc.) (e.g., one or more accounting cores that perform operations relating to billing for data usage, one or more data path cores that perform operations related to routing and/or processing data, etc.). In some implementations, network processing unit 220 may receive information from and/or transmit information to another device in environment 200.

Content device 230 may include a server device, or the like, that hosts or serves content (e.g., a device that provides content via one or more websites). In some implementations, content device 230 may include a repository of content for inclusion in one or more webpages. For example, content device 230 may store and/or provide an image, an audio file, a video file, a script, an advertisement, or the like. In some implementations, content device 230 may receive information from and/or transmit information to another device in environment 200.

Billing device 240 may include one or more devices capable of managing billing information and/or session time record information for a toll-free data service. For example, billing device 240 may include a computing device, such as a server (e.g., a web server, a database server, etc.), or a similar device associated with a network operator (e.g., a network operator of network 260). In some implementations, billing device 240 may be capable of billing a user associated with user device 210 and/or a content provider (e.g., a content provider associated with a toll-free data service) for data usage related to a toll-free data service. In some implementations, billing device 240 may receive information from and/or transmit information to another device in environment 200.

Validation device 250 may include one or more devices capable of receiving, storing, processing, and/or providing information. For example, validation device 250 may include a computing device, such as a server, or a similar device. In some implementations, validation device 250 may receive information from and/or transmit information to another device in environment 200.

Network 260 may include one or more wired and/or wireless networks. For example, network 260 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
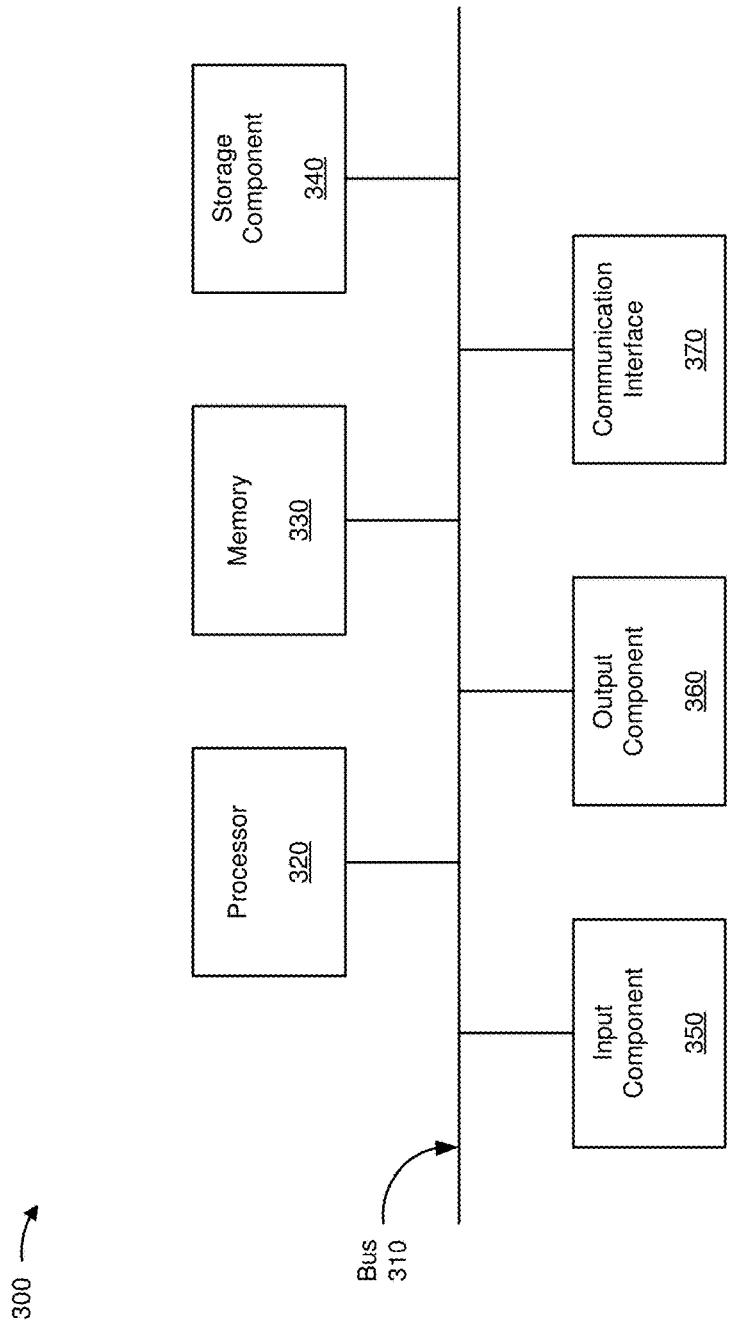
FIG. 3 is a diagram of example components of one or more devices of FIG. 2.

FIG. 3 is a diagram of example components of a device 300. Device 300 may correspond to user device 210, network processing unit 220, content device 230, billing device 240, and/or validation device 250. In some implementations, user device 210, network processing unit 220, content device 230, billing device 240, and/or validation device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
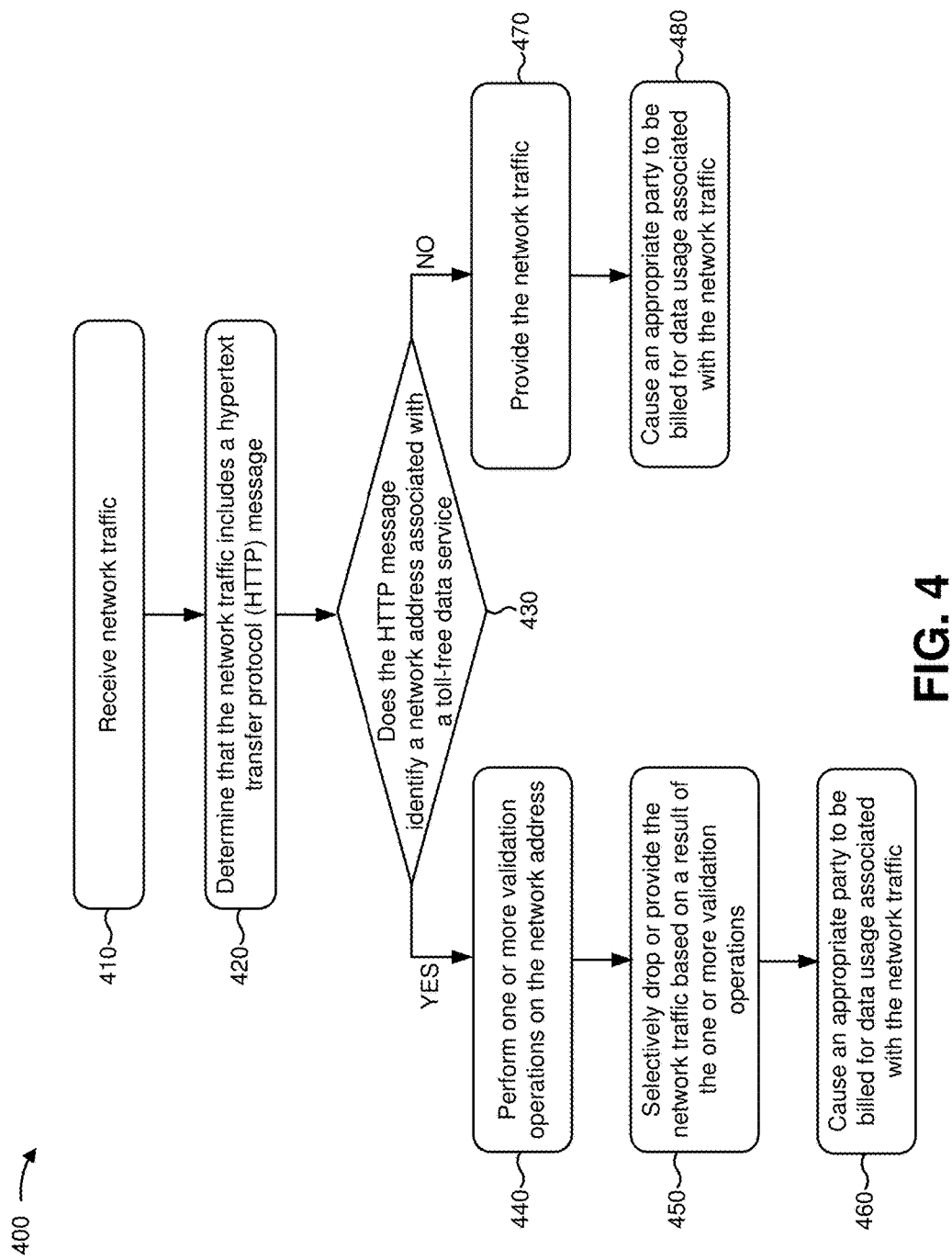
FIG. 4 is a flow chart of an example process for validating network traffic for a toll-free data service.

FIG. 4 is a flow chart of an example process 400 for validating network traffic for a toll-free data service. In some implementations, one or more process blocks of FIG. 4 may be performed by network processing unit 220. In some implementations, one or more process blocks of FIG. 4 may be performed by another device or a group of devices separate from or including network processing unit 220, such as user device 210, content device 230, billing device 240, and validation device 250.

As shown in FIG. 4, process 400 may include receiving network traffic (block 410). For example, network processing unit 220 may receive network traffic. In some implementations, network processing unit 220 may receive the network traffic from user device 210. For example, user device 210 may provide network traffic to network processing unit 220 (e.g., en route to content device 230, via one or more devices of a cellular network, etc.). Additionally, or alternatively, network processing unit 220 may receive the network traffic from another device, such as content device 230, or the like. For example, content device 230 may provide network traffic to network processing unit 220 (e.g., en route to user device 210, via one or more devices of a cellular network, etc.).

In some implementations, the network traffic may include, for example, a packet, a set of packets, or the like. For example, network processing unit 220 may receive packets, and may process the packets to determine whether the packets contain network addresses corresponding to toll-free content, as described in more detail elsewhere herein. In some implementations, the network traffic may include a set of packets (e.g., in a situation where a data payload has been divided across multiple packets based on HTTP chunking, IP fragmentation, etc.). In some implementations, the network traffic may include an HTTP request, an HTTP response, or the like, as described in more detail below.

In some implementations, network processing unit 220 may receive the network traffic via a network session (e.g., a Transmission Control Protocol (TCP) session, an Internet Protocol (IP) session, an HTTP session, etc.). For example, user device 210 may establish a network session with content device 230 (e.g., via network processing unit 220 and/or one or more other network devices). User device 210 and content device 230 may transmit network traffic via the network session. In some implementations, user device 210 and/or content device 230 may establish a network session based on user device 210 attempting to access toll-free content associated with content device 230 (e.g., for use as a toll-free data session), as described in more detail below.

In some implementations, one or more cores (e.g., chips, cards, etc.) of network processing unit 220 may receive the network traffic. For example, in some implementations, network processing unit 220 may include multiple, different data path cores for routing or processing network traffic, which may increase traffic capacity of network processing unit 220. A particular data path core, of the multiple, different data path cores, may receive the network traffic, and may perform operations related to routing the network traffic, validating the network traffic, billing for the network traffic, or the like, as described in more detail below.

As further shown in FIG. 4, process 400 may include determining that the network traffic includes a hypertext transfer protocol (HTTP) message (block 420). For example, network processing unit 220 may determine that the network traffic includes an HTTP request and/or an HTTP response. The network traffic may include an HTTP request (e.g., provided by user device 210) or may include an HTTP response (e.g., provided by content device 230).

In some implementations, network processing unit 220 may determine that the network traffic includes an HTTP message based on a regular expression. For example, a process associated with network processing unit 220 (e.g., a finite automaton process, a hyper-fine automaton process, etc.) may parse the network traffic based on regular expressions. In some implementations, network processing unit 220 may use regular expressions to determine that the network traffic includes an HTTP message and to determine whether the HTTP message relates to a toll-free data service, as described in more detail in connection with block 430, below.

In some implementations, network processing unit 220 may determine that the network traffic includes a portion of an HTTP message. For example, some HTTP messages may be divided across multiple packets (e.g., based on an HTTP chunking method, an IP fragmentation method, etc.). Network processing unit 220 may determine that a particular packet includes a portion of an HTTP message based on information identifying which portion of the HTTP message the packet includes (e.g., based on a transfer encoding value, a content length value, etc.). In such a case, network processing unit 220 may hold the particular packet until network processing unit 220 receives the remaining portion(s) of the HTTP message. In some implementations, network processing unit 220 may store a copy of the particular packet, and may provide the particular packet to a destination of the particular packet, which reduces disruption of network traffic.

In some cases, network processing unit 220 may determine that the network traffic does not include an HTTP message. For example, network processing unit 220 may determine that the network traffic does not include an HTTP message, or a portion of an HTTP message, based on parsing the network traffic, based on one or more regular expressions, or the like. In such a case, network processing unit 220 may store information indicating that the network traffic does not include an HTTP message or a portion of an HTTP message (e.g., based on a counter, etc.). In this way, network processing unit 220 tracks network usage information, which permits a network administrator to audit information relating to the toll-free data service.

As further shown in FIG. 4, if the HTTP message identifies a network address associated with a toll-free data service (block 430—YES), process 400 may include performing one or more validation operations on the network address (block 440). For example, network processing unit 220 may determine that the HTTP message includes a network address that is associated with a toll-free data service. When the HTTP message includes a network address that is associated with a toll-free data service, network processing unit 220 and/or another device (e.g., validation device 250, etc.) may perform one or more validation operations on the network address and/or the HTTP message.

In some implementations, network processing unit 220 may determine whether a network address is associated with a toll-free data service based on one or more regular expressions. For example, network processing unit 220 may parse network traffic to determine whether the network traffic includes an HTTP message. When network processing unit 220 detects an HTTP message in network traffic, network processing unit 220 may parse the HTTP message to detect a network address (e.g., a path, a URI, etc.). Network processing unit 220 may parse a detected network address to determine whether the network address is associated with a toll-free data service. For example, network processing unit 220 may parse the network address to determine whether the network address includes tags corresponding to particular validation information. As one possible example, network processing unit 220 may use the following regular expressions, or regular expressions similar to the following regular expressions, to determine whether the network address is associated with a toll-free data service:

[i]^(get|options|head|post|put|delete|trace|connect)
http://.*&AuthSid=.*&ExpTime=[0-9]+&Auth-
Key=[0-9]+&AuthSign=[0-9]+\.[0-9]+\.*HTTP/
1.[0-1]\r\n  Expression 1

[i]^(get|options|head|post|put|delete|trace|connect)
.*&AuthSid=.*&ExpTime=[0-9]+&AuthKey=
[0-9]+&AuthSign=[0-9]+\.[0-9]+\.*HTTP/1.[0-
1]\r\n  Expression 2

Based on the above regular expressions, network processing unit 220 may identify a network address that is associated with a toll-free data service. For example, when parsing an HTTP message based on Expression 1, network processing unit 220 may return a "hit" when the HTTP message includes a first string of "get," "options," "head," "post," "put," "delete," "trace," or "connect," a second string of "http://.*&AuthSid=.*&ExpTime=[0-9]+&AuthKey=[0-9]+&AuthSign=[0-9]+\.[0-9]+\.*" (e.g., where ".*" indicates a wildcard and "[0-9]" identifies a string of numerical characters of any length), and a third string of "HTTP/1.[0-1]\r\n". Expression 1 may return a "hit" when an HTTP message includes a URI that includes tags identifying a snippet identifier, an expiration time, a key identifier, and a received signature. Similarly, Expression 2 may return a "hit" when an HTTP message identifies a path that includes tags identifying a snippet identifier, an expiration time, a key identifier, and a signature.

In some implementations, network processing unit 220 may perform a validation operation by generating a validation signature based on information included in the network address. For example, the network address may include a key identifier that is associated with a security key. Network processing unit 220 may identify the key identifier (e.g., based on a regular expression, such as "{i}&AuthKey=," or the like), and may obtain the security key based on the key identifier (e.g., from a key management device, from validation device 250, from local storage, etc.).

Network processing unit 220 may generate a validation signature using the security key based on information included in the network address, and may compare the validation signature to a received signature that is associated with the network address. In some implementations, network processing unit 220 may identify the received signature based on a regular expression (e.g., {i}&AuthSign=, or a similar regular expression). If the validation signature matches the received signature, network processing unit 220 may successfully validate the network address. If the validation signature does not match the received signature, network processing unit 220 may fail to validate the network address. In this way, network processing unit 220 improves security of the validation process.

In some implementations, network processing unit 220 may perform a validation operation by determining whether information associated with the HTTP message matches locally stored information. For example, network processing unit 220 may locally store information for validating network addresses (e.g., key identifiers and/or security keys that are associated with a toll-free data campaign, etc.). Network processing unit 220 may determine whether information received in an HTTP message (e.g., a received key identifier) matches locally stored information (e.g., information identifying key identifiers that are associated with a toll-free data campaign). When the information received in the HTTP message matches the locally stored information, network processing unit 220 may validate the network address. When the information received in the HTTP message does not match the locally stored information, network processing unit 220 may fail to validate the network address. In this way, network processing unit 220 improves security of the validation process.

In some implementations, network processing unit 220 may provide information based on validating a network address. For example, in a situation where network processing unit 220 successfully validates a network address, network processing unit 220 may provide information relating to the network address and/or an HTTP message that includes the network address. For example, network processing unit 220 may provide billing information to billing device 240, or the like. In some implementations, network processing unit 220 may store information based on validating a network address. For example, network processing unit 220 may store information identifying the network address, a toll-free data campaign associated with the network address, a time at which the network address was validated, a quantity of data transmitted in association with the HTTP message and/or the network address, may increment a counter based on validating the network address, or the like.

In some implementations, network processing unit 220 may associate a network session with a toll-free data service based on receiving a toll-free data request via the network session. For example, user device 210 may establish a network session with content device 230 to access a toll-free data service. Network processing unit 220 may determine that network traffic received via the network session is associated with the toll-free data service. In such a case, network processing unit 220 may determine that the network session is associated with the toll-free data service, and may automatically charge data usage via the network session to a particular party (e.g., a content provider associated with content device 230, etc.), which conserves processor resources of network processing unit 220 as compared to determining a party to bill for each packet individually.

In some implementations, network processing unit 220 may determine that subsequent network traffic via the network session is not associated with a toll-free data service, and may accordingly determine that the network session is no longer associated with a toll-free data service. For example, assume that a user of user device 210 accesses first toll-free content via a network session, and then accesses second non-toll-free content via the network session. In such a case, network processing unit 220 may first determine that the network session is associated with a toll-free data service, and may store and/or provide information indicating that the network session is a toll-free data session. Based on receiving network traffic associated with the second non-toll-free content, network processing unit 220 may determine that the toll-free data session has ended, and may store and/or provide information accordingly (e.g., billing information, etc.).

As further shown in FIG. 4, process 400 may include selectively dropping or providing the network traffic based on a result of the one or more validation operations (block 450). For example, network processing unit 220 may selectively drop or provide the network traffic based on a result of the one or more validation operations. When the one or more validation operations are successful, network processing unit 220 may provide the network traffic to a destination of the network traffic (e.g., user device 210, content device 230, etc.). When one or more of the validation operations are not successful, network processing unit 220 may drop the network traffic.

In some implementations, network processing unit 220 may provide a payload that is associated with a HTTP message. For example, a packet may include a header and a payload. The header may include the HTTP message, and the payload may include data to be provided to a destination identified by the HTTP message. Network processing unit 220 may validate the packet (e.g., based on information included in the HTTP message, such as a network address), and may selectively drop the packet, or provide the packet and the payload, based on a result of validating the packet. In this way, network processing unit 220 increases security of the cellular network by validating packets to determine whether to provide or drop the packets, thereby preventing malicious parties from taking advantage of a toll-free data service.

In some implementations, a first core (e.g., chip, card, etc.) of network processing unit 220 may provide information to one or more second cores (e.g., chips, cards, etc.) of network processing unit 220 based on a result of a validation operation. For example, a first core (e.g., a data path core) may receive network traffic and may perform validation operations to determine whether the network traffic is associated with a toll-free data service. Based on a result of the validation operations, the first core may provide information to other cores of network processing unit 220 (e.g., other data path cores, an accounting core, etc.). In a situation where the network traffic is associated with a toll-free data service, network processing unit 220 may provide information indicating that the network traffic is associated with the toll-free data service (e.g., information relating to a source of the network traffic, a destination of the network traffic, a network session via which the network traffic is received, a snippet identifier associated with the toll-free data service and/or the network traffic, etc.).

In some implementations, a first core of network processing unit 220 may determine billing information based on information received from a second core of network processing unit 220. For example, assume that a first core processes network traffic that is associated with a toll-free data service and a network session, and assume that the first core provides information to a second core indicating that the network session is associated with the toll-free data service. In such a case, when the second core of network processing unit 220 receives network traffic that is associated with the network session, the second core of network processing unit 220 may store information identifying data usage in association with the network traffic. When network processing unit 220 provides billing information relating to the toll-free data service, network processing unit 220 may obtain the billing information from each core that stores information corresponding to the network session. In this way, network processing unit 220 determines billing information for network traffic that is processed by multiple, different cores (e.g., chips, cards, etc.), which improves accuracy of the billing information and improves throughput of network processing unit 220.

As further shown in FIG. 4, process 400 may include causing an appropriate party to be billed for data usage associated with the network traffic (block 460). For example, network processing unit 220 may cause an appropriate party to be billed for data usage associated with the network traffic. In some implementations, network processing unit 220 may obtain usage information identifying data usage by user device 210 in association with the toll-free data campaign. For example, network processing unit 220 may store session information identifying a toll-free data session via which user device 210 obtained data, and may cause user device 210, or a subscriber (e.g., a content provider associated with content device 230, a user associated with user device 210, etc.) associated with a toll-free data campaign, to be billed based on the session information. In some implementations, network processing unit 220 may obtain the usage information from multiple, different cores (e.g., chips, cards, etc.) of network processing unit 220 (e.g., one or more data path cores, one or more accounting cores, etc.).

If network processing unit 220 determines that validation information (e.g., a key identifier, a network address signature, an expiration time, etc.) or a toll-free data campaign associated with the network traffic is invalid, network processing unit 220 may determine that a user (e.g., a user associated with user device 210) of the toll-free data service is to be billed. Additionally, or alternatively, if network processing unit 220 determines that the validation information and the toll-free data campaign are all valid, network processing unit 220 may determine that a content provider (e.g., a content provider associated with content device 230) of the toll-free data service is to be billed. Network processing unit 220 may provide billing information (e.g., billing information determined by one or more cores, chips, cards, or the like of network processing unit 220, etc.) to billing device 240, and billing device 240 may bill the user and/or the content provider accordingly.

As further shown in FIG. 4, if the HTTP message does not identify a network address associated with a toll-free data service (block 430—NO), process 400 may include providing the network traffic (block 470). For example, when the HTTP message does not include a network address associated with a toll-free data service, network processing unit 220 may provide the network traffic toward a destination identified by the HTTP message. In some implementations, a toll-free data service may be associated with a particular network port. When network processing unit 220 receives network traffic, via the particular network port, that is not associated with the toll-free data service, network processing unit 220 may drop the network traffic.

As further shown in FIG. 4, process 400 may include causing an appropriate party to be billed for data usage associated with the network traffic (block 480). For example, network processing unit 220 may cause an appropriate party to be billed for data usage associated with the network traffic. When the HTTP message does not include a network address that is associated with a toll-free data service, network processing unit 220 may cause billing device 240 to bill a user associated with user device 210 for the data usage. In some implementations, network processing unit 220 may obtain information describing the data usage (e.g., locally stored information associated with an accounting core and/or one or more data path cores), and may provide the information to billing device 240. In this way, network processing unit 220 facilitates billing of an appropriate party for data usage via a toll-free data session.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, a network processing unit causes an appropriate party to be billed for data usage when accessing toll-free content. In some cases, the network processing unit may use regular expressions, or a similar method of parsing strings, to identify information related to billing for the data usage, which conserves processor resources of the network processing unit. In some cases, the network processing unit may track data usage using multiple different cores, which improves capacity of the network processing unit.

The foregoing disclosure provides illustration and description, but is not intended to be exhaustive or to limit the implementations to the precise form disclosed. Modifications and variations are possible in light of the above disclosure or may be acquired from practice of the implementations.

Some implementations described herein are described in relation to regular expressions. The regular expressions described herein are not intended to be exhaustive or limiting with regard to regular expressions that may be implemented. For example, a regular expression may include additional characters, fewer characters, different characters, a different arrangement of characters, etc. as compared to those described herein.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
     receive network traffic;
     determine that the network traffic includes a hypertext transfer protocol (HTTP) message;
     determine, based on the HTTP message, that the network traffic is associated with a toll-free data service,
       the toll-free data service causing a first party to be billed for data usage associated with the network traffic by a second party;
     obtain validation information based on parsing the HTTP message using one or more regular expressions,
       a network address, included in the HTTP message, including one or more tags that identify one or more locations of the validation information in the network address, and
       the one or more regular expressions causing the device to obtain the validation information based on detecting the one or more tags;
     perform one or more validation operations, based on the validation information included in the HTTP message, to determine whether to provide the network traffic or drop the network traffic,
       the network traffic being provided when the one or more validation operations are successful, and
       the network traffic being dropped when the one or more validation operations are unsuccessful; and
     cause the first party or the second party to be billed for the data usage based on the network traffic being provided and associated with the toll-free data service.

2. The device of claim 1, where the one or more processors, when determining that the network traffic is associated with the toll-free data service, are to:
   determine, based on information included in the network address included in the HTTP message, that the network traffic is associated with the toll-free data service.

3. The device of claim 1, where the one or more processors, when performing the one or more validation operations, are to:
   determine whether the validation information matches locally stored information associated with the toll-free data service and whether a validation signature received in association with the network address matches a signature generated based on the validation information,
     the one or more validation operations being successful when the validation information matches the locally stored information and when the validation signature matches the signature, and
     the one or more validation operations being unsuccessful when the validation information does not match the locally stored information or when the validation signature does not match the signature.

4. The device of claim 1, where the first party is a content provider that provides toll-free content associated with the toll-free data service, and where the second party is a user associated with a user device that accesses the toll-free content.

5. The device of claim 1, where the network traffic is first network traffic; and
   where the one or more processors are further to:
     provide a toll-free data session start message to a plurality of cores of the device based on the one or more validation operations being successful, the plurality of cores performing operations related to routing or processing the network traffic;
receive second network traffic, after receiving the first network traffic, that is not associated with the toll-free data service; and
provide a toll-free data session end message to the plurality of cores based on the second network traffic not being associated with the toll-free data service.

6. A non-transitory computer-readable medium storing instructions, the instructions comprising:
one or more instructions that, when executed by one or more processors of a device, cause the one or more processors to:
receive network traffic;
determine that the network traffic includes a hypertext transfer protocol (HTTP) message;
determine, based on a network address identified by the HTTP message, that the network traffic is associated with a toll-free data service,
the toll-free data service causing a first party to be billed for data usage associated with the network traffic by a second party;
obtain validation information based on parsing the HTTP message using one or more regular expressions,
the network address, identified by the HTTP message, including one or more tags that identify one or more locations of the validation information in the network address, and
the one or more regular expressions causing the device to obtain the validation information based on detecting the one or more tags;
perform one or more validation operations, based on the validation information, to determine whether to provide or drop the network traffic,
the network traffic being provided when the one or more validation operations are successful, and
the network traffic being dropped when the one or more validation operations are unsuccessful; and
cause the first party or the second party to be billed for the data usage based on a result of the one or more validation operations.

7. The non-transitory computer-readable medium of claim 6, where the one or more instructions, that cause the one or more processors to perform the one or more validation operations, cause the one or more processors to:
obtain, from the network address, a signature and a key identifier that is associated with a security key,
the signature being generated based on information included in the network address;
obtain, based on the key identifier, the security key;
generate, based on the information included in the network address and using the security key, a validation signature; and
perform a validation operation based on comparing the signature and the validation signature,
the validation operation being successful when the signature matches the validation signature.

8. The non-transitory computer-readable medium of claim 6, where the HTTP message includes one or more of:
an HTTP request originating from a device associated with the second party, or
an HTTP response originating from a device associated with the first party.

9. The non-transitory computer-readable medium of claim 6, where the one or more instructions, that cause the one or more processors to determine that the network traffic includes the HTTP message, cause the one or more processors to:
determine that the network traffic includes the HTTP message based on the one or more regular expressions,
the one or more regular expressions causing the one or more processors to detect one or more of an HTTP message type, the network address, or an end of the HTTP message.

10. The non-transitory computer-readable medium of claim 6, where the network traffic is received via a network session; and
where the one or more instructions, when executed by the one or more processors, further cause the one or more processors to:
provide, to one or more cores of the device, a message indicating that the network session is associated with the toll-free data service.

11. The non-transitory computer-readable medium of claim 10, where the network traffic is first network traffic; and
where the one or more instructions, when executed by the one or more processors, further cause the one or more processors to:
receive second network traffic via the network session;
determine that the second network traffic is not associated with the toll-free data service; and
provide another message, to the one or more cores, indicating that the network session is no longer associated with the toll-free data service.

12. The non-transitory computer-readable medium of claim 11, where the one or more instructions, that cause the one or more processors to cause the first party or the second party to be billed, cause the one or more processors to:
obtain billing information from the one or more cores identifying the data usage,
the one or more cores storing the billing information based on routing or processing the first network traffic or the second network traffic; and
cause the first party or the second party to be billed based on the billing information.

13. A method, comprising:
receiving, by a device, network traffic;
determining, by the device, that the network traffic includes a hypertext transfer protocol (HTTP) message;
determining, by the device and based on a network address identified by the HTTP message, that the network traffic is associated with a toll-free data service,
the toll-free data service causing a first party to be billed for data usage associated with the network traffic by a second party;
obtaining, by the device, validation information based on parsing the HTTP message using one or more regular expressions,
the network address, identified by the HTTP message, including one or more tags that identify one or more locations of the validation information in the network address, and
the one or more regular expressions causing the device to obtain the validation information based on detecting the one or more tags;
performing, by the device, one or more validation operations, based on the validation information, to determine whether to provide or drop the network traffic,
the network traffic being provided when the one or more validation operations are successful, and the network traffic being dropped when the one or more validation operations are unsuccessful; and causing, by the device, the first party or the second party to be billed for the data usage based on a result of the one or more validation operations.

14. The method of claim 13, where the validation information includes one or more of:

a snippet identifier that identifies the toll-free data service, an expiration time that identifies a time at which the toll-free data service expires, a key identifier that identifies a security key, or a signature that is generated based on the key identifier.

15. The method of claim 14, where performing the one or more validation operations comprises:

determining whether the snippet identifier matches a particular format; and performing a validation operation based on whether the snippet identifier matches the particular format, the validation operation being successful when the snippet identifier matches the particular format.

16. The method of claim 13, further comprising:

storing, by a first core of the device, billing information relating to the toll-free data service, the billing information being obtained by one or more second cores of the device; and where causing the first party or the second party to be billed comprises:

causing, based on the billing information, the first party or the second party to be billed.

17. The method of claim 16, where the network traffic is received via a network session; and where the method further comprises:

providing, to the first core and the one or more second cores, information indicating that the network session is associated with the toll-free data service; and determining the billing information based on a quantity of data transmitted via the network session in association with the network traffic.

18. The device of claim 1, where the network traffic is received via a Transmission Control Protocol (TCP) session or an Internet Protocol (IP) session.

19. The device of claim 1, where the one or more processors, when parsing the HTTP message using one or more regular expressions, are to:

parse the HTTP message utilizing a finite automaton process or a hyper-fine automaton process.

20. The method of claim 13, further comprising:

parsing the HTTP message utilizing a finite automaton process or a hyper-fine automaton process.

* * * * *